United States Patent [19]

Davis

[11] Patent Number: 4,473,610
[45] Date of Patent: Sep. 25, 1984

[54] COMPOSITE WEATHERPROOF ROOFING SYSTEM

[76] Inventor: Lester Davis, P.O. Box 214, Nokomis, Fla. 33555

[21] Appl. No.: 484,524

[22] Filed: Apr. 13, 1983

[51] Int. Cl.$^3$ .................. B32B 15/08; B32B 17/10
[52] U.S. Cl. .................. 428/143; 428/150; 428/285; 428/286; 428/426; 428/441; 428/457; 428/461
[58] Field of Search ............ 428/150, 141, 245, 246, 428/285, 286, 441, 457, 461, 143, 426; 52/515, 309.1, 309.13

[56] References Cited

U.S. PATENT DOCUMENTS

| | | | |
|---|---|---|---|
| 441,036 | 11/1890 | Siebel | 428/285 X |
| 1,983,495 | 12/1934 | Fischer | 428/150 X |
| 2,241,819 | 5/1941 | Kirschbraun et al. | 428/150 X |
| 4,212,913 | 7/1980 | Auten | 428/441 X |
| 4,233,353 | 11/1980 | Bondoc et al. | 428/141 |
| 4,291,086 | 9/1981 | Auten | 428/441 X |
| 4,296,162 | 10/1981 | Jean | 428/285 X |
| 4,357,377 | 11/1982 | Yamamoto | 428/285 X |

FOREIGN PATENT DOCUMENTS 54-148889  11/1979  Japan .................. 428/285

Primary Examiner—Lorraine T. Kendell
Attorney, Agent, or Firm—Hauke and Patalidis

[57] ABSTRACT

To a substrate is added a plurality of layers of materials comprising: a first layer of thermoplastic acrylic resin, to which is added a layer of aluminum foil. Over the aluminum foil is added a layer of the resin and to the top surface of the resin is added a layer of chopped strand fiber glass mat. Over the fiber glass mat is added a layer of the resin and on top of the resin is added a finish coat of paint.

In some applications aggregate material is added to the finish coat of paint.

7 Claims, 2 Drawing Figures

COMPOSITE WEATHERPROOF ROOFING SYSTEM

BACKGROUND OF THE INVENTION

The present invention relates to roofing systems and, more particularly, to weatherproof roofing systems of the built-up type as they are applied to existing roofs, or to new roofs.

The invention consists in features and combinations of materials in such a way that a composite weatherproof roofing system is achieved that is flexible in hot or cold weather, that will not crack or peel, and that eliminates costly roof maintenance. IIThe present roofing system is ideal for flat roofs and, in particular, roofs for manufactured homes.

SUMMARY OF THE INVENTION

A plurality of layers of materials are applied to a base or substrate, including a first layer of thermoplastic acrylic resin, to which is applied a second layer of aluminum foil. To the aluminum foil is applied a third layer of the thermoplastic acrylic resin, thereover is applied a fourth layer of fiber glass chopped strand mat. Over the fourth layer of fiber glass mat is applied a fifth layer of the thermoplastic resin, and a final layer of paint is applied to the fifth layer of resin.

In some applications, aggregate material is mixed with the paint and the combination is applied as the sixth layer.

For a further understanding of the invention and for some features and advantages thereof, reference may be made to the following description and to the drawing showing one embodiment and a modification of the invention.

DETAILED DESCRIPTION

Figure 1:
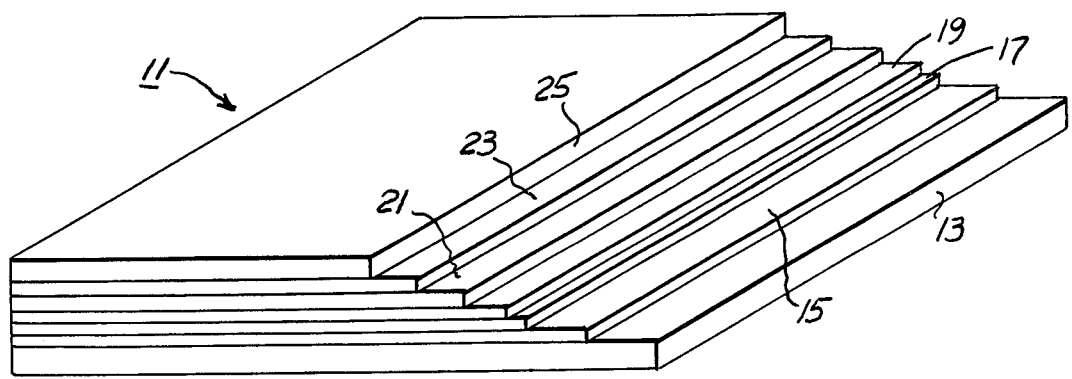
FIG. 1 is a schematic view of the several layers of materials comprising a composite roofing system in accordance with the invention.

Referring to the drawing, FIG. 1 illustrates several layers of materials comprising the composite roofing system of the present invention 11 that includes a base or substrate 13 of conventional fiberboard which is installed on conventional trusses or rafters forming the roof support of a building.

To the substrate roofing material 13 is applied a first layer 15 of thermoplastic acrylic resin. The thermoplastic acrylic resin that I prefer is ACRYLOID B-50, Solid Grade, manufactured and sold by Rohm and Haas Company of Philadelphia, PA. I have found that this resin is best applied by using rollers rather than using brushes or spraying equipment. Over the top surface of the resin layer 15 is laid a second layer 17 comprising aluminum foil. I prefer METALLATION Reflective Insulation, Breather Type, sold by Reynolds Aluminum Supply Co of Richmond, VA. as the aluminum layer.

A third layer 19 comprising the thermoplastic acrylic resin is applied to the top surface of the aluminum foil layer 17, and onto the top surface of the third resin layer 19 is applied a fourth layer 21 comprising fiber glass mat. I have found that LARATON chopped strand mat, sold by Owens Corning Fiberglas Corp. of Toledo, OH. is satisfactory, but other kinds of fiber glass mat may be used if preferred.

To the top surface of the fourth layer 21 comprising chopped strand fiber glass mat is applied a fifth layer 23 comprising the thermoplastic acrylic resin, ACRYLOID B-50 Solid Grade. To the top surface of such resin is applied a final sixth layer 25 of paint of any desired color. I have found POLYGARD/GEL COAT, sold by Polygard, Inc of Tampa FL. is a satisfactory product for the sixth layer.

Figure 2:
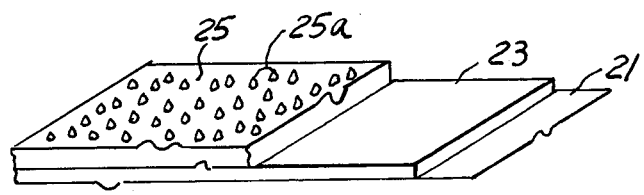
FIG. 2 is a schematic view of a portion of the structure of FIG. 1, but with a modification to one of the layers thereof.

Referring again to the drawing, FIG. 2 illustrates schematically a portion of the roofing system of FIG. 1, but with the improvement or modification of aggregate material 25a added to the top surface coating. The aggregate may be marble chips or small gravel or other material of choice.

I have found that the plain paint material, POLYGARD/GEL COAT, like the resin material, is best applied with rollers, but other ways to apply these materials may be found and used if preferred However, I have tried other ways and found that the results are not as satisfactory.

From the foregoing description of the invention, those skilled in the art will recognize several significant features and advantages thereof, among which are:

That the roofing system does not deteriorate, nor is it subject to rotting in damp and humid climates;

That the roofing system can be walked on within one hour after being layed, and is completely cured in thirty days; and That the roofing system is maintenance-free and provides a good measure of insulation from cold and reflectance from the sun.

Although the invention has been described herein with a certain degree of particularity, it is understood that modifications may be made therein without departing from the spirit of the invention as defined by the scope of the claims.

What is claimed is:

1. A roofing system comprising in combination:
   a substrate;
   a first layer or strata comprising a resin compound applied to the top surface of said substrate;
   a second strata comprising aluminum foil applied to the top surface of the first strata;
   a third strata of said resin compound applied to the top surface of said aluminum foil;
   a fourth strata comprising fiber glass mat applied to the top surface of said third strata;
   a fifth strata of said resin compound applied to the top surface of said fiber glass mat; and
   a finish strata of paint applied to the top surface of said fifth strata.
2. The invention of claim 1 wherein,
   said substrate is pregnated fiber board.
3. The invention of claim 1 wherein, an aggregate material is embedded in said finish strata.
4. The invention of claim 3 wherein,
   said aggregate material comprises marble chips.
5. The invention of claim 3 wherein,
   said aggregate comprises gravel.
6. The invention of claim 1 wherein,
   said first, third and fifth strata consist of a thermoplastic acrylic resin.
7. The invention of claim 1 wherein,
   said fiber glass mat is chopped strand matting.

* * * * *